United States Patent
Gary, Jr. et al.

(10) Patent No.: US 11,018,888 B2
(45) Date of Patent: May 25, 2021

(54) METHODS OF REMOTE CONTROL OF APPLIANCES

(71) Applicant: WHIRLPOOL CORPORATION, Benton Harbor, MI (US)

(72) Inventors: Wyndham F. Gary, Jr., Whitefish Bay, WI (US); Michael J. Jakeway, Bridgman, MI (US); David W. Mundy, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 792 days.

(21) Appl. No.: 15/360,052

(22) Filed: Nov. 23, 2016

(65) Prior Publication Data
US 2017/0163438 A1 Jun. 8, 2017

Related U.S. Application Data

(60) Provisional application No. 62/262,611, filed on Dec. 3, 2015.

(51) Int. Cl.
*H04L 12/28* (2006.01)
*F24C 7/08* (2006.01)
*H04L 29/08* (2006.01)

(52) U.S. Cl.
CPC .......... *H04L 12/2818* (2013.01); *F24C 7/082* (2013.01); *H04L 12/282* (2013.01);
(Continued)

(58) Field of Classification Search
USPC ....................................................... 709/208
See application file for complete search history.

(56) References Cited

U.S. PATENT DOCUMENTS

| 5,349,162 A * | 9/1994 | Holling | F24C 7/082 |
| | | | 219/445.1 |
| 7,137,126 B1 * | 11/2006 | Coffman | G06F 3/167 |
| | | | 719/328 |

(Continued)

FOREIGN PATENT DOCUMENTS

| KR | 20020036478 A1 | 5/2002 |
| WO | 2009138359 A2 | 11/2009 |
| WO | 20120062890 A2 | 5/2012 |

OTHER PUBLICATIONS

European Patent Application No. 16201832.9 filed Dec. 1, 2016, Applicant Whirlpool EMEA SpA, European Search Report, dated Feb. 27, 2017 re: same.

(Continued)

*Primary Examiner* — Vivek Srivastava
*Assistant Examiner* — Hien V Doan
(74) *Attorney, Agent, or Firm* — McGarry Bair PC

(57) ABSTRACT

A system and methods for remote control of one or more appliances are provided. An external computing device, such as a mobile device, may be registered and associated with an appliance to be remotely controlled and monitored. The external computing device and the appliance to be remotely controlled by the external computing device may each be in communication with an external server via a network. When a remote control mode of the appliance is enabled, a selected operation of the appliance may be carried out in response to a remote control command generated by the external computing device.

23 Claims, 10 Drawing Sheets

(52) U.S. Cl.
CPC ........ *H04L 67/125* (2013.01); *H04L 67/2814* (2013.01); *G08C 2201/42* (2013.01); *G08C 2201/93* (2013.01)

(56) References Cited

U.S. PATENT DOCUMENTS

| | | |
|---|---|---|
| 2006/0033604 A1 | 2/2006 | Tzeng |
| 2006/0168618 A1 | 7/2006 | Choi |
| 2006/0259183 A1 | 11/2006 | Hayes et al. |
| 2008/0109310 A1* | 5/2008 | Ebrom ................. G06Q 30/02 705/14.56 |
| 2009/0118848 A1* | 5/2009 | Santinato ........... A47L 15/4293 700/90 |
| 2009/0231275 A1* | 9/2009 | Odgers ................ G06F 1/1692 345/157 |
| 2011/0041562 A1 | 2/2011 | Balinski et al. |
| 2012/0110747 A1 | 5/2012 | Yum |
| 2013/0146581 A1* | 6/2013 | Donarski ............... F24C 7/087 219/413 |
| 2013/0214935 A1 | 8/2013 | Kim et al. |
| 2013/0268134 A1 | 10/2013 | Tuller |
| 2013/0277353 A1 | 10/2013 | Joseph et al. |
| 2013/0290902 A1 | 10/2013 | Martin et al. |
| 2014/0018962 A1 | 1/2014 | Jung et al. |
| 2014/0067094 A1 | 3/2014 | Park et al. |
| 2014/0095684 A1 | 4/2014 | Nonaka et al. |
| 2014/0121786 A1 | 5/2014 | Chen et al. |
| 2014/0156082 A1* | 6/2014 | Ha ......................... D06F 33/02 700/275 |
| 2014/0310973 A1 | 6/2014 | Bae et al. |
| 2014/0218517 A1 | 8/2014 | Kim et al. |
| 2014/0277602 A1 | 9/2014 | Ditlow et al. |
| 2014/0303783 A1 | 10/2014 | Ha et al. |

OTHER PUBLICATIONS

European Search Report for European Application 16201832.9, dated Jun. 2, 2017, 11 pages.

* cited by examiner

METHODS OF REMOTE CONTROL OF APPLIANCES

RELATED APPLICATION(S)

This application claims the priority benefit of U.S. Provisional Patent Application No. 62/262,611, filed on Dec. 3, 2015, the entirety of which is incorporated herein by reference.

FIELD

This document relates, generally, to operation and control of home appliances, and in particular, to remote operation and control of home appliances.

BACKGROUND

Numerous different devices may communicate with a local network, and be interconnected via the local network, and the local network may provide for communication with devices outside of the local network. For example, a home network may provide for interconnection of numerous different devices within the household, and may provide for communication between the networked devices and an external network, for example, a server connected to an external network. This type of connectivity may allow for remote control of devices within the network, such as, for example, home appliances in communication with the network, by one or more electronic devices also connected to the network.

SUMMARY

In one aspect, a method of controlling an appliance in a network may include receiving, by the appliance, a first input including a selection of an operation to be executed by the appliance, receiving, by the appliance, a second input, from an external device via a server; and executing the selected operation in response to the second input.

In another aspect, an appliance may include a housing, a chamber included in the housing, the chamber receiving items therein for treatment, a door coupled to the housing to selectively open and close an access opening into the chamber, a control panel configured to receive user input, a controller controlling operation of the appliance based on the user input received at the control panel, and a communication device in communication with the controller, and providing for communication between the controller and an external server via a local network including a router. In a remote control mode of the appliance, the controller may be configured to process a first input, the first input including a selection of an operation to be executed by the appliance, receive a second input, from an external device via the server, and execute the selected operation in response to the second input.

The details of one or more implementations are set forth in the accompanying drawings and the description below. Other features will be apparent from the description and drawings, and from the claims.

DETAILED DESCRIPTION

Appliances, for example, residential, or home, appliances, may include features allowing the appliances to communicate with a network. This communication with a network may, in turn, provide for remote control and monitoring by, for example, another device, such as, for example, a computing device, also connected to the network. Current systems may not allow for positive verification of, for example, a status of the appliance and/or contents of a chamber of the appliance prior to remote start and/or a remote stop and/or alteration of operating parameters during operation. For example, a remote start of a cooking cycle of an oven, without positive verification of the contents, may pose a potential hazard, if contents of the oven have changed since the user's last interaction with the oven, depending on the contents and the selected settings. Accordingly, systems and methods, in accordance with embodiments as broadly described herein, may provide for positive verification and confirmation of a status and/or items to be treated by the appliance prior to allowing remote control of operation of the appliance.

Figure 1:
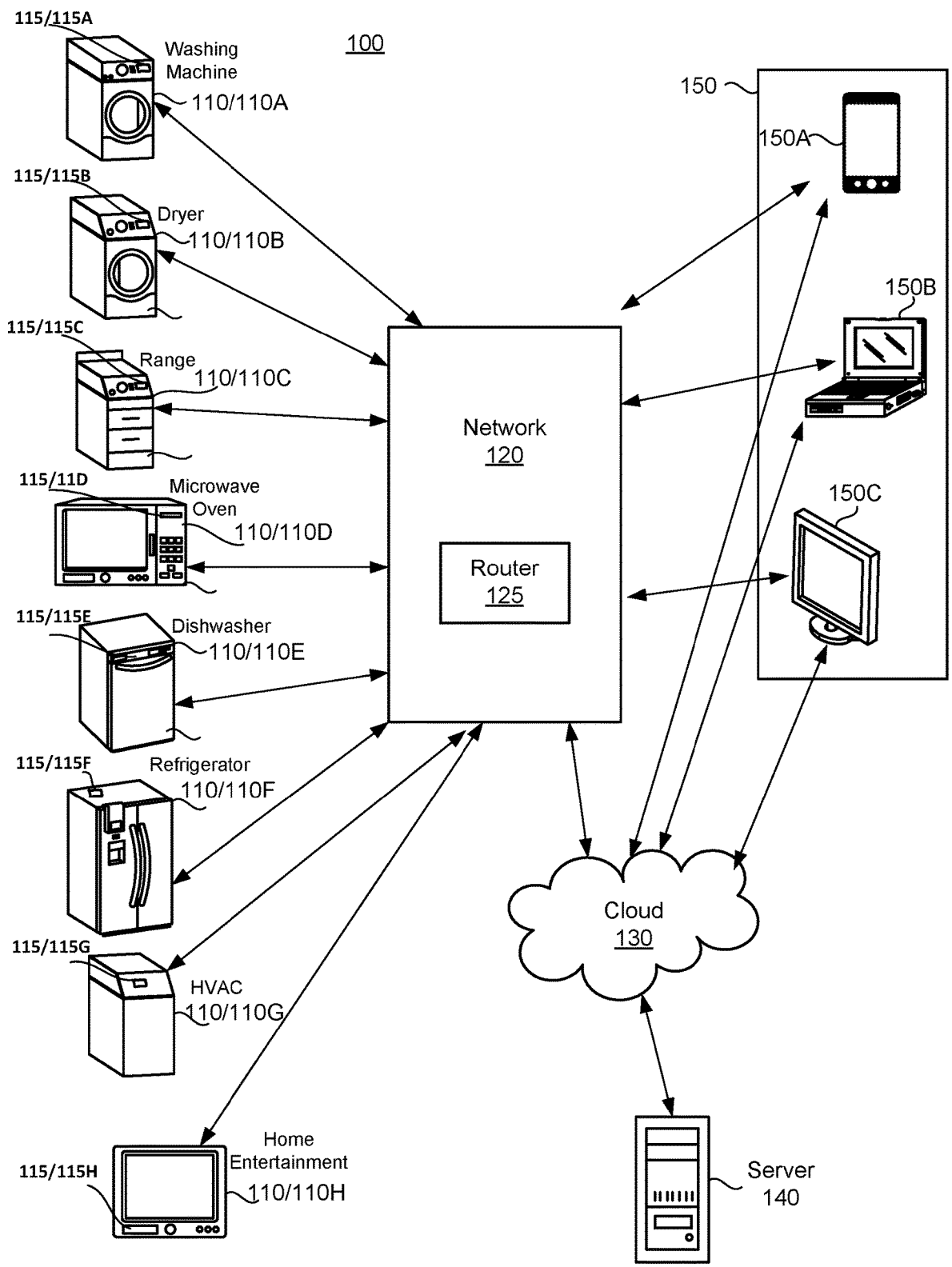
FIG. 1 illustrates a system of networked appliances, in accordance with embodiments as broadly described herein.

An example of a system of networked appliances which may be remotely controlled and monitored by a separate external device is illustrated in FIG. 1. For ease of discussion and illustration, the example system includes a plurality of residential appliances, operating within a residential network. However, the principles to be described herein may be applied to remote control and monitoring of other types of appliances, in other types of environments, such as, for example, industrial environments, commercial environments, and the like. In the example shown in FIG. 1, one or more of these appliances may communicate with an external network to allow for remote control and monitoring of the plurality of appliances using a variety of different computing devices.

As shown in FIG. 1, the system 100, in accordance with embodiments as broadly described herein, may include a plurality of appliances 110A through 110G, in communication with a network 120. Hereinafter, simply for ease of discussion, the various different types of example appliances 110A through 110G shown in FIG. 1 will be referred to as appliances 110. In the example system 100 shown in FIG. 1, the appliances 110 may include, for example, one or more laundry treatment appliances such as, for example, a washing machine 110A, a dryer 110B and the like, a cooking appliance such as, for example, a cooktop, a range 110C, a microwave oven 110D and the like, a dishwasher 110E, a refrigerator 110F, an HVAC system 110G, a home entertainment system 110H, and other such appliances. Each of the appliances 110 may include a communication device 115

(respectively, 115A through 115H, in the example shown in FIG. 1), allowing the appliances 110 to use the network 120 via, for example, a router 125, to connect to the cloud 130, one or more external/remote servers 140, and various other computing devices that may be remote, or may be located within the operating environment of the appliances 110. Such computing devices 150 may include, for example a smartphone 150A, a desktop and/or laptop computing device 150B, a tablet computing device 150C, a smartwatch, and the like. The router 125 may relay and/or exchange data between the various communication devices 115 of the appliances 110 and the various external devices via the network 120. Communication and data exchange between the computing devices 150 and the appliances 110, via, for example, the network 120 and the cloud 130, may allow a user to remotely monitor and/or control operation of the appliances 110. In some embodiments, this arrangement may allow the user to confirm an operating status of the appliance 110, confirm contents of an operating chamber of the appliance 100, and use the confirmation of operating status and contents to make informed, deliberate decisions as to the operation and control of the appliance 100, thus enhancing user convenience and ease of use.

In some embodiments, each appliance 110 may include its own, respective communication device 115. In some embodiments, one or more of the communication devices 115 may communicate wirelessly with the router 125, and may be integrally implemented into the respective appliance 110, or may be installed post-production, to provide for connection to and communication with the network 120.

For example, in some embodiments, the wireless communication devices 115 may be a software-defined radio, in which components typically implemented in hardware (for example, mixers, filters, amplifiers, modulators/demodulators, detectors, and the like) are instead implemented in software on an embedded system coupled to an antenna for connection to the network. In some embodiments, the wireless communication devices 115 may be configured as a software enabled-access point (SoftAP), allowing an antenna provided with the wireless communication device 115 to function as both a wireless application protocol (WAP) and a client. As a client, the wireless communication device 115 may wirelessly communicate with the router 125. As a WAP, the wireless communication device 115 may establish wireless communication with other wireless devices such as, for example, the computing device 150. Communication between the communication devices 115 of the appliances 110 and the router 125/network 120 may be carried out via, for example, a WiFi connection, a Bluetooth connection, near field communication, and the like.

Each of the appliances may include a control panel including an input device configured to receive user input for operating the appliance. In some embodiments, in addition to the control panel, the appliance may be configured to receive user input from one or more of the external devices 150, via the cloud 130 and/or server 140, for remote control of the appliance, for example when a remote control mode of the appliance is enabled and/or operation of the appliance within established parameters can be confirmed by remote access to the appliance. Remote control of the appliance when a remote control mode is specifically enabled, and/or when operation within the established parameters can be confirmed by remote access prior to operation, may prevent inadvertent operation of the appliance, operation of the appliance in an unintended manner, and the like, particularly in a situation in which the appliance is unattended/the user is not co-located with the appliance to personally observe and oversee operation, while still enhancing user convenience.

Figure 2:
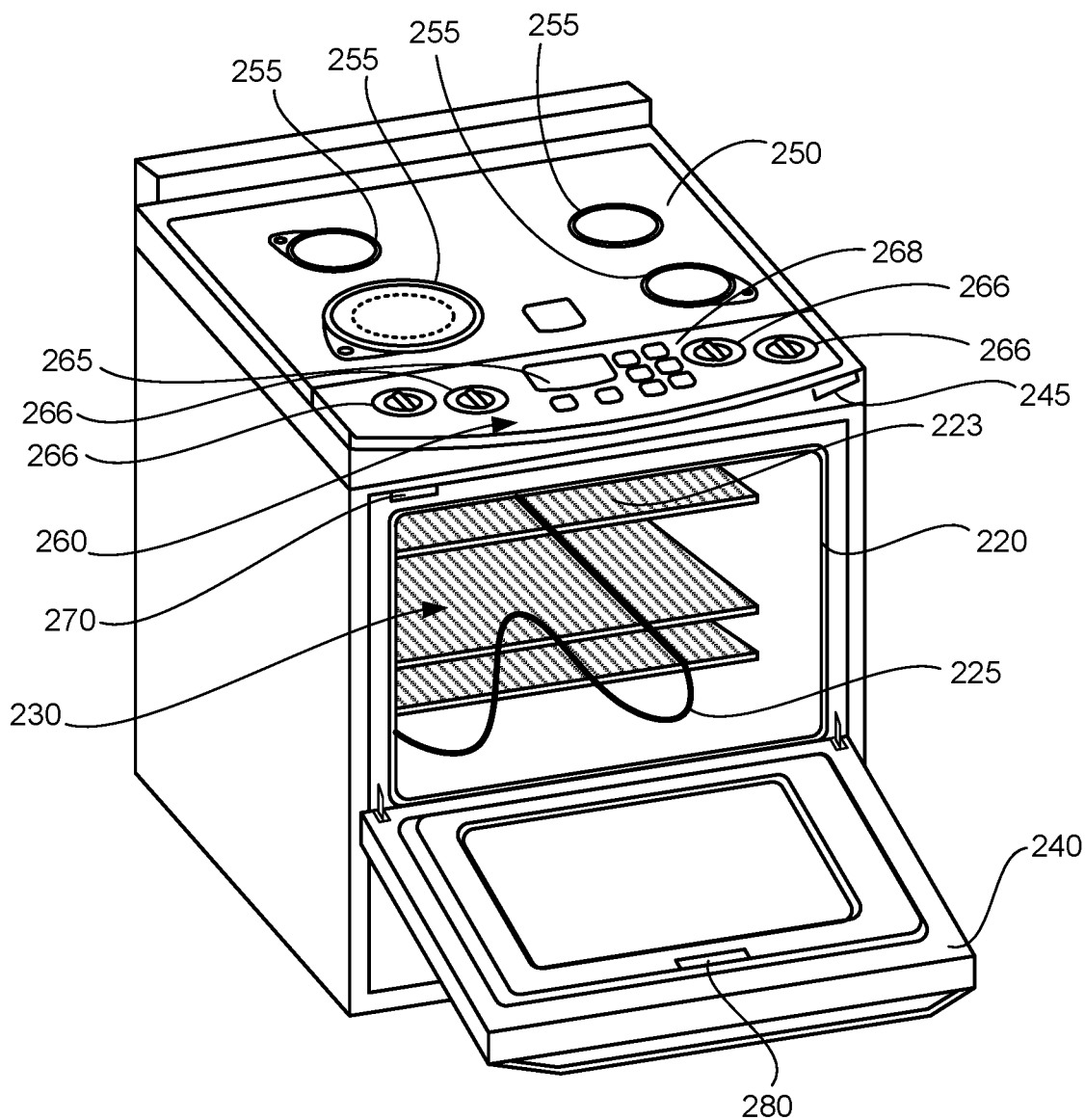
FIG. 2 is a perspective view of an example appliance, in accordance with embodiments as broadly described herein.

FIG. 2 is a perspective view of an example cooking appliance which may be included in the networked system shown in FIG. 1. The cooking appliance shown in FIG. 2 is provided as an example, simply for ease of discussion and illustration, and the remote control principles to be described herein may be applied to the operation and control of other types of appliances, operating in other types of environments, in a similar manner. The example cooking appliance 200, or range 200, shown in FIG. 2 may include a housing 210 having an opening 220 providing access to a cooking chamber 230, or oven 230, with a door 240 coupled to the housing 210 to selectively open and close the opening 220. One or more racks 223 may be positioned in the oven 230, with one or more heating elements 225 to generate heat in the oven 230. A cooktop 250 on a top of the housing 210 may include a plurality of cooking areas 255, or burners 255. A control panel 260 may receive user input for operation and control of the appliance 200, and may output information related to the operation and control of the appliance 200 to the user.

The control panel 260 may include a display area 265 including, for example a liquid crystal display (LCD) and/or a light emitting diode (LED) display, knobs 266 and other types of control areas 268, such as, for example, touch sensitive buttons and the like. In this example implementation, the knobs 266 and control areas 268 may be manipulated by the user to control operational features associated with the burners 255 and/or the heating elements 225 of the oven 230, such as, for example, a cooking temperature, a cooking time, a timing function, a clock function, and other such control functions associated with operation of the range 200, with the display area 265 displaying operational information to the user. In some embodiments, a door sensor 270 may sense an open and closed state of the door 240 relative to the opening 220 in the housing 210. In some embodiments, an image sensor 280, or camera 280, may be configured to capture images of the interior of the oven 230. In the example shown in FIG. 2, the image sensor 280 is shown in a portion of the door 240. However, the image sensor 280 may be provided at various different locations on the range 200, as long as the positioning of the image sensor 280 allows the image sensor 280 to capture an image of the interior of the oven 230.

In some implementations, the cooking appliance 200, or range 200, may include a sensor 245, for example, on an outer surface of the range 200, for example, on an outer surface of the housing 210 or the door 240, oriented so that the sensor 245 may detect motion and/or images in the vicinity of the range 200. For example, the sensor 245 may detect motion of users in the room, may detect specific user gestures intended for detection by the sensor 245, may detect images identifying specific external devices 150 and/or users, and the like.

Figure 3:
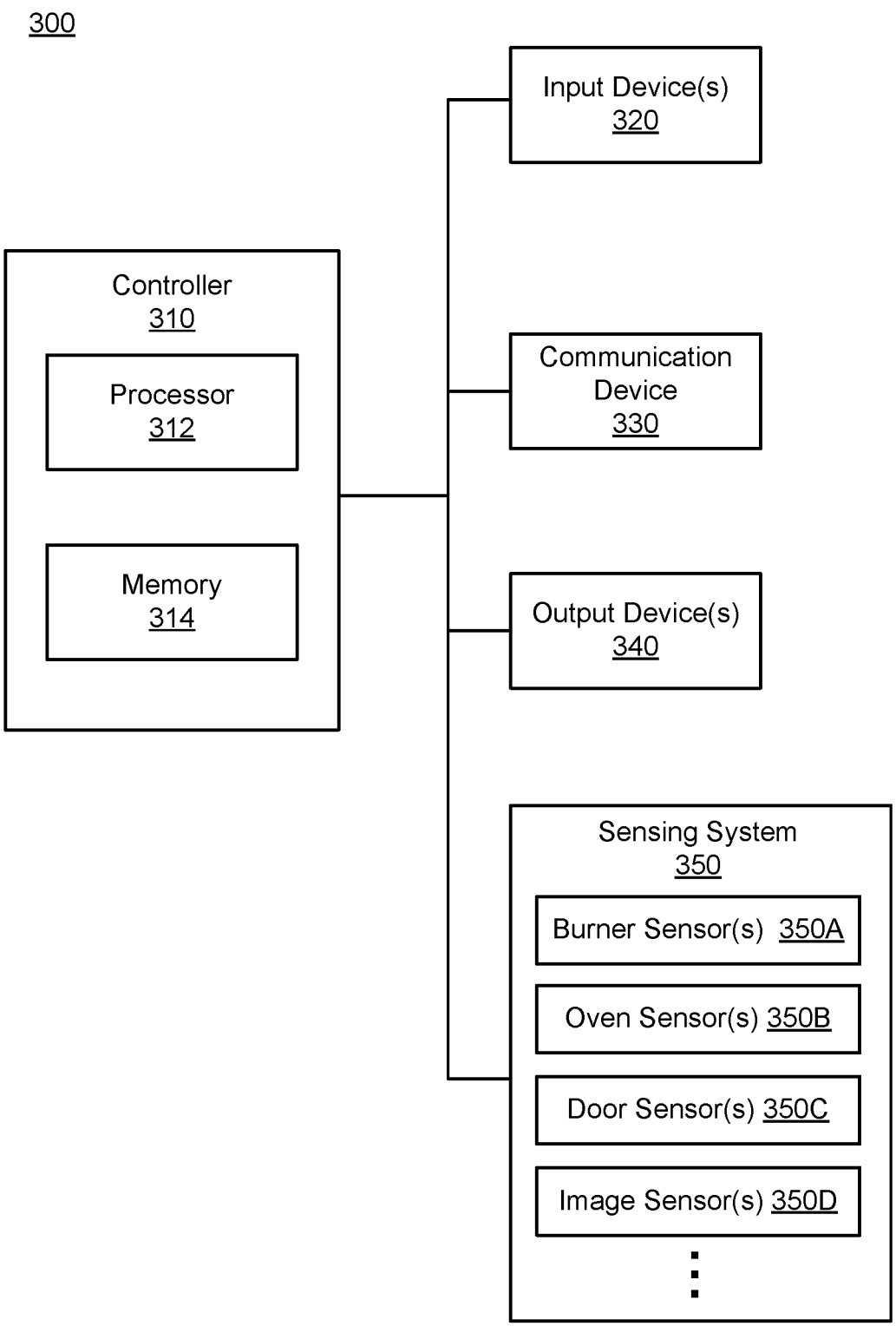
FIG. 3 is a block diagram of an example appliance, in accordance with embodiments as broadly described herein.

FIG. 3 is a block diagram of an example cooking appliance, similar to the range 200 shown in FIG. 2. As noted above, the example cooking appliance is shown in FIG. 3 simply for ease of discussion and illustration, and the principles to be discussed may be applied to other types of appliances such as, for example, the appliances shown in FIG. 1. As shown in FIG. 3, the example cooking appliance 300 may include a controller 310 to control operation of the appliance 300 in response to user inputs received via input devices 320, such as, for example, the knob(s) 266 and control area(s) 268 shown in FIG. 2. In some embodiments, a communication device 330 may receive user inputs via a network, such as the network 120 shown in FIG. 1, to control operation of the appliance 300. In some embodiments, the communication device 330 may be similar to the communication device(s) 115 discussed above with respect to FIG. 1. User commands input at, for example, an external device such as one of the external devices 150 shown in FIG. 1, may be transmitted to the controller 310, via the communication device 330, to control operation of the appliance 300. In response to the received user inputs, the controller 310 may control, for example, on and off states of various components of the appliance 300, such as, for example, the burner(s) 255 and/or heating element(s) 225 shown in FIG. 2, to initiate and/or terminate a cooking operation, to maintain a desired cooking temperature and/or time, and other such functions.

In some embodiments, the controller 310 may include a processor 310 and a memory 312 including, for example, a random access memory (RAM) and a read only memory (ROM), to control software to be executed by the processor 312 in controlling the supply of power to the various components of the appliance 300, to control an on/off state of the various components of the appliance 300, and/or maintain a selected temperature. The controller 310 may also be operably coupled with one or more output devices 340, such as, for example, the display 265 shown in FIG. 2, to externally communicate an operational state and status of the appliance 300 to the user. The controller 310 may also be operably coupled with a sensing system 350 providing information to the processor 310 for use in the execution of the software controlling operation of the appliance 300. In the case of the example cooking appliance 300, the sensing system 350 may include, for example, one or more burner temperature sensors 350A sensing a temperature level, or output level, of each of the burners, one or more oven temperature sensors 350B sensing a temperature in the cooking cavity, or oven, a door open/closed sensor 350C sensing an open/closed state of the door, one or more sensors 350D configured to selectively capture images of the interior of the cooking cavity, capture images of the room in which the appliance 300 is installed, detect motion in the vicinity of the appliance 300, and other sensors as necessary.

As noted above, an appliance, such as one of the appliances 110 shown in FIG. 1, may be remotely controlled using an external device, such as, for example, one or more of the external computing devices 150 shown in FIG. 1, when both the appliance 110 and the external device 150 can communicate with the external server 140, such as, for example, a server hosted by a manufacturer capable of verifying ownership of the appliance 110, as well as verifying access to a particular appliance by a particular user device. For example, the server 140 may verify ownership of a particular appliance corresponding to a particular user. That user may then follow a registration process, through the server 140, to associate the user's external computing device 150, for example, a mobile device 150, with the appliance 110. Thus, remote access to a particular appliance 110 may be controlled by the user through the server 140, with remote control of the appliance 110 limited only to devices that have been specifically registered and authorized by the user for communication with the appliance 110. In some implementations, a user having the proper login credentials may log into an application running on a mobile device 150, and set operating parameters for operation of the appliance 110. After setting the operating parameters and selecting a start option from the application, the user may be prompted with another login screen, requiring login credentials for remote control of the operation of that appliance 110. If the appliance login credentials match the previously stored appliance login credentials associated with the selected appliance 110 to be operated by remote control, the user may execute remote control of the operation of the appliance 110 via the application running on the mobile device 150, and the appliance 110 may initiate operation in accordance with the operating parameters set by the user.

In one example embodiment, a user may manipulate one or more elements of the control panel to enable a remote control mode of the appliance, once a relationship between the appliance and a an external user device has been verified and established. For example, after registration is complete and a relationship is established as discussed above, a user may enable a remote control feature of the appliance, for example, a remote start of an operation of the appliance, may be enabled by selecting the operation features as the features would be selected for immediate operation, and placing a pause on the operation, rather than starting the operation, with the operation to be resumed in response to a command received via remote control. This pause may be selected by, for example, a relatively rapid double manipulation, or double click, of a Start button, allowing the parameters to be set, but completing the entry and double manipulation before the selected operation has an opportunity to begin (i.e., before the heating element 225 of the oven 230 begins to heat, before a tub of a washing machine begins to fill with water and the like). This may allow the remote control mode to be enabled in a relatively simple, relatively intuitive manner, without the need for a dedicated Pause button or other dedicated remote control enablement devices and/or processes.

Figure 4A:
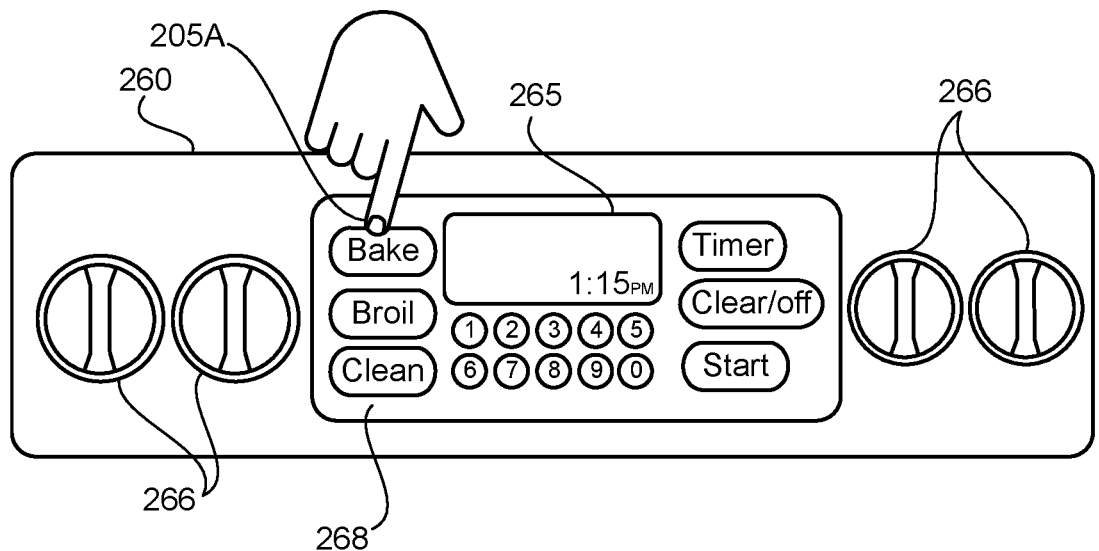
FIGS. 4A-4E illustrate a remote control setup process, in accordance with embodiments as broadly described herein.
Figure 4B:
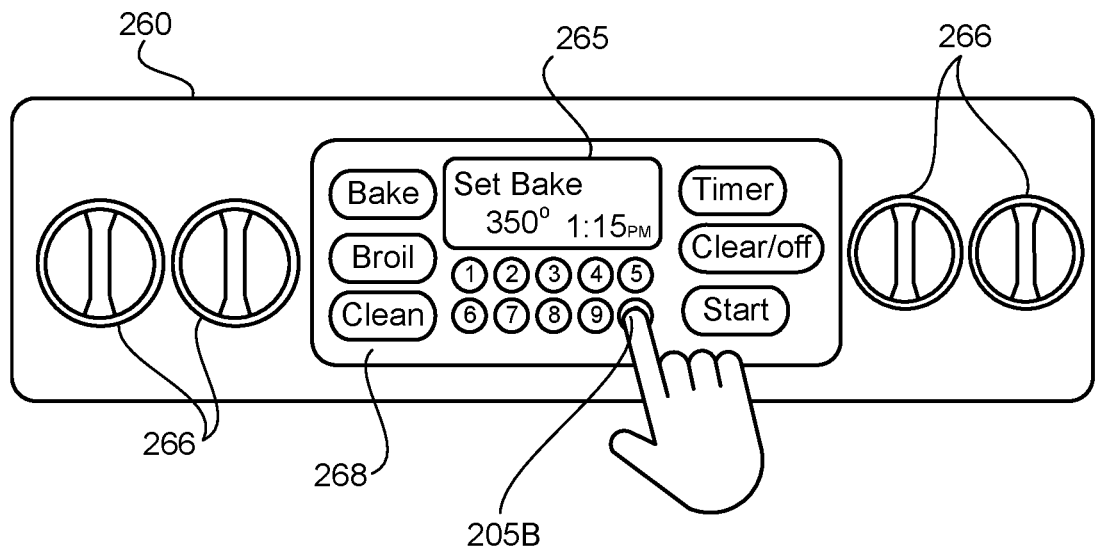
Figure 4C:
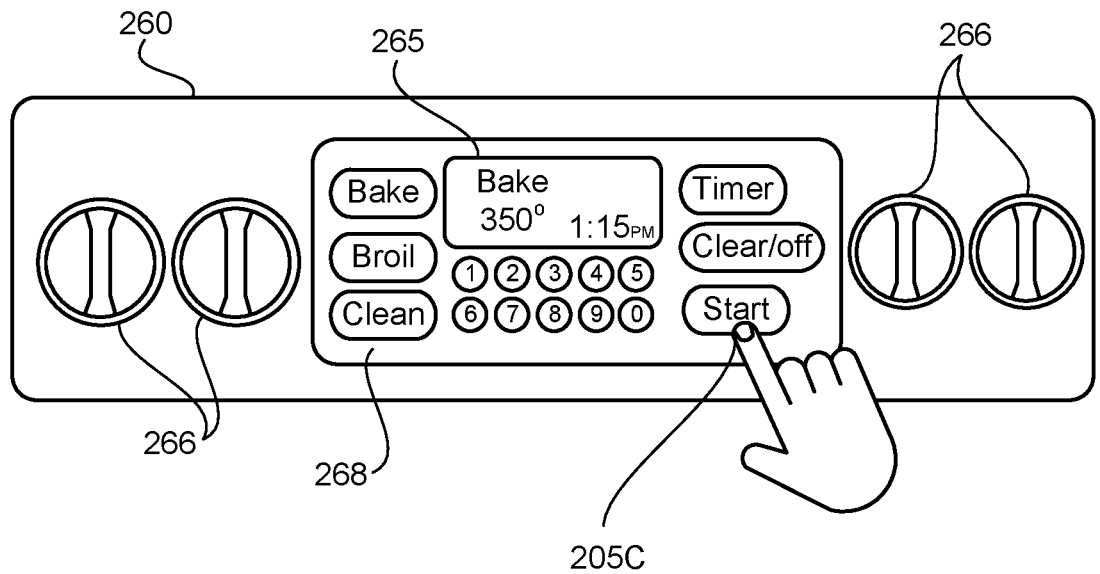
Figure 4D:
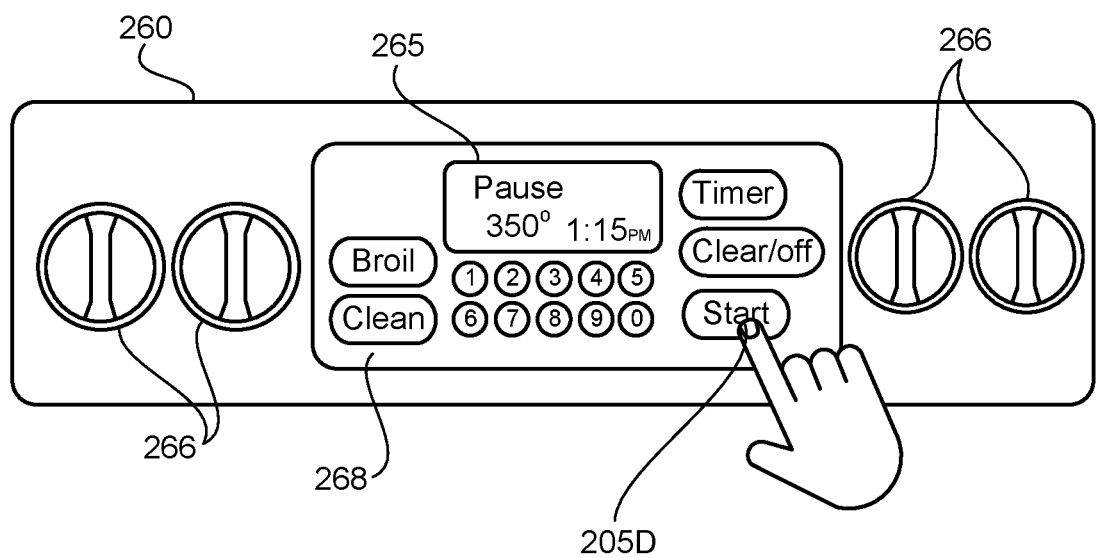
Figure 4E:
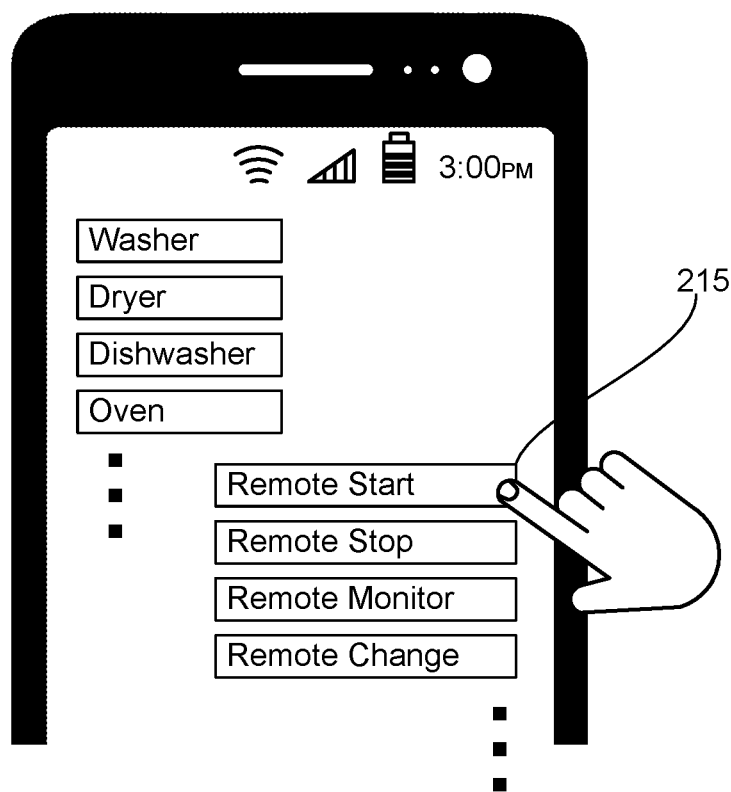
Figure 4E:
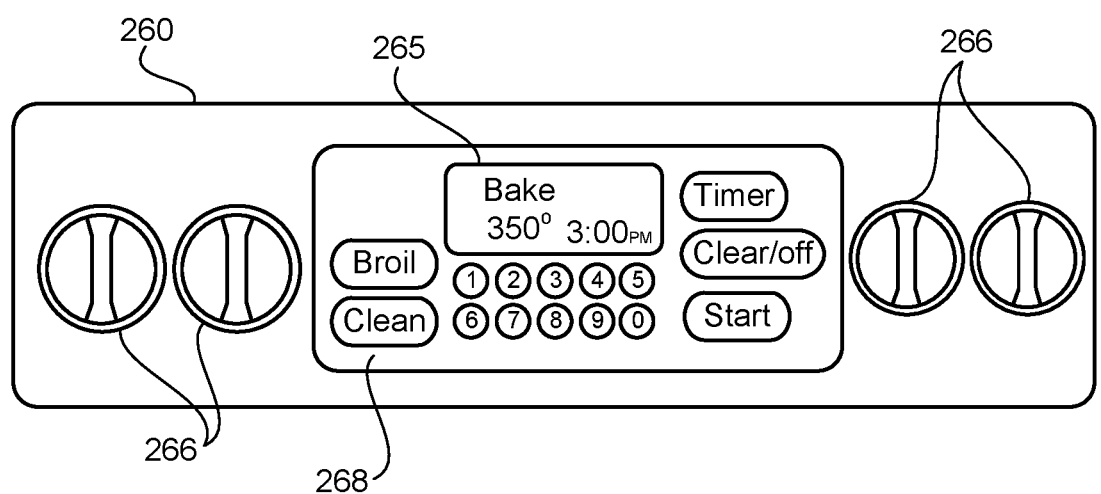

For example, a user may place an item in the oven 230 (of the cooking appliance 200 shown in FIG. 2), with cooking to be initiated at a later, yet to be determined time. The user may then use features of the control panel 260 to provide a first input 205 (205A, 205B, 205C, 205D), the first input 205 including a selection of the cooking parameters to be implemented in response to a command to initiate cooking, the command to initiate cooking being received via remote control. In the example implementation shown in FIGS. 4A-4E, the user has placed an item in the oven 230, to be baked at 350 degrees, with the intention of initiating baking at a later time, via remote control. In making the first input, the user may make a first selection 205A indicating selection of the bake function 205A, as shown in FIG. 4A, and then make a second selection 205B indicating selection of the desired baking temperature, as shown in FIG. 4B, using, for example, the selection buttons 268 on the control panel 260. The user may then make a third selection 205C, for example, a selection of the Start button, to indicate that entry of cooking parameters has been completed, as shown in FIG. 4C, and make a fourth selection 205D, for example, selection of the Start button again to pause, or hold, the cooking operation pending a remote control command to initiate the cooking operation, and enabling a remote control mode, as shown in FIG. 4D. The user may then, at a later time, use the external device 150 that has been registered and associated with the appliance 200 via the server 140 as discussed above, to provide a second input 215 to remotely control the oven 230 and initiate cooking at the previously selected operation parameters, as shown in FIG. 4E. In some implementations, the operation of the appliance 200 may be remotely controlled via user manipulation of an application running on the registered external device 150.

In some implementations, operation of the appliance 200 in the remote control mode, particularly when a cycle, for example, a cooking cycle of the appliance 200 illustrated in FIGS. 4A-4D, may be enabled simply by initiating the cycle locally, via inputs at the control panel 260. For example, in some implementations, a cooking cycle may be initiated in response to entry of cooking parameters and selection of the start button the control panel 260, as shown in FIGS. 4A-4D. In some implementations, this initiation of the cooking cycle locally, for example, via user entry of the cooking parameters and initiation of the cooking cycle directly at the control panel 260 of the appliance 200, may automatically initiate operation in the remote control mode.

The operating parameters selected in FIGS. 4A-4E are simply examples, and other features, such as timer setting and the like may also be included in the selection and setting of operation parameters to be initiated by remote control. Similarly, while the example implementation shown in FIGS. 4A-4E employs the mobile external device 150 and network 140 to initiate a remote start of the cooking operation, communication between the mobile external device 150 and the appliance via the network 140 may also facilitate remote control of other operations, such as, for example, termination of an operation currently being carried out, monitoring of a status of the appliance and/or monitoring of a current operation being carried out by the appliance, changes to previously set operation parameters, and the like, after operation of the appliance has been started.

Further, while the example implementation shown in FIGS. 4A-4E uses a cooking appliance and parameters of a cooking operation to illustrate the remote initiation of a cooking cycle in accordance with previously selected operating parameters, similar principles may be applied to the remote control of other types of appliances. For example, a user may select washing cycle operation parameters using a control panel of a washing machine, and/or drying cycle operation parameters using a control panel of a dryer, and/or cleaning cycle operation parameters using a control panel of a dishwasher, and then pause or hold the initiation of the selected cycle for initiation at a later time via remote control using a mobile external device, in a similar manner as described above with respect to FIGS. 4A-4E.

Figure 5:
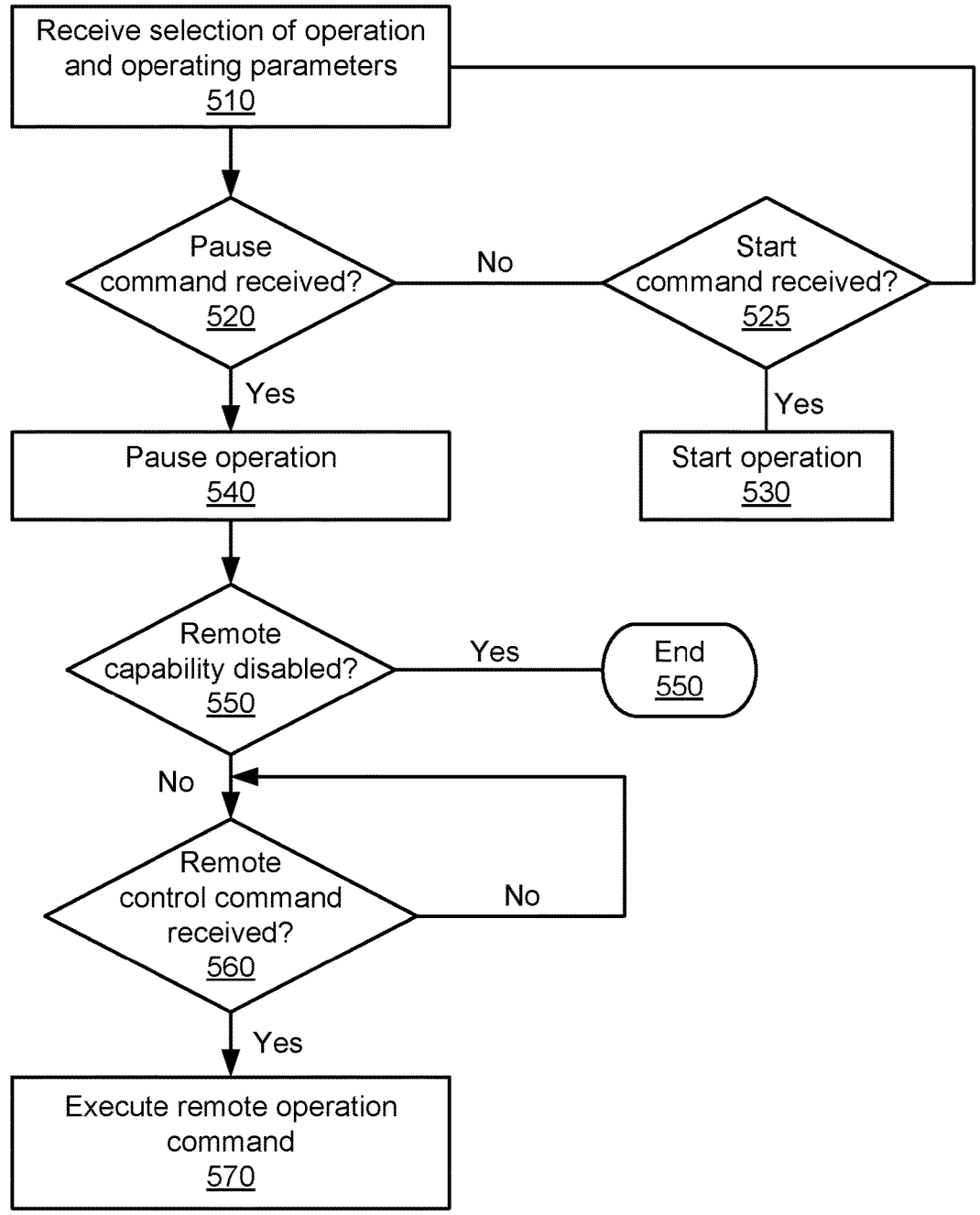
FIG. 5 is a flowchart of a method of controlling an appliance, in accordance with embodiments as broadly described herein.

FIG. 5 is a flowchart of a method 500 of controlling an appliance, in accordance with embodiments as broadly described herein. First, a selection of cycle(s) and/or operating parameters may be received, for example, by user manipulation of features such as knobs and buttons of a control panel of the appliance, at block 510. This may be similar to the example shown in FIGS. 4A-4C, in which the control panel 260 of the cooking appliance 200 is illustrated, and may be carried out on various other appliances for selection of applicable cycle(s) and/or operating parameters in a similar manner.

If, after receiving the selection of cycle(s) and/or operating parameters, a command to pause, or hold, initiation of the selected operation is received, at block 520, initiation of the operation may be paused, at block 540. This may be similar to the example shown in FIG. 4D, in which the start button (or other designated button) of the control panel 260 is selected, or pushed, in a set manner (for example, a double tap, or double click as described above with respect to FIG. 4D) to pause initiation of the selected operation and enable remote control, and may be carried out on various other appliances in a similar manner. If a command to pause initiation of the selected cycle is not received, for example, within a predetermined amount of time, and it is determined, at block 525, that a start command has been received, operation is initiated at block 530. The predetermined amount of time may be measured beginning, for example, at completion of the user's selection of operating parameters (as illustrated in the example shown in FIG. 4D).

It may be determined, at block 550 whether remote control capability for the appliance has been disabled. Remote control capability for the appliance may be disabled by, for example, detection of an event which may trigger disabling of the remote control capability. These triggering events may include, for example, detection of an opening of the door of the appliance, sensed by, for example, the door sensor of the appliance. An opening of the door may indicate a change in the contents of the cavity (for example, a change in contents of the cooking cavity 230, or oven 230, of the cooking appliance 200, or a change in the mixture of laundry items received in a treating cavity of a laundry machine and the like), which may produce undesirable results if the previously selected operation were carried out. In some embodiments, remote control capability may be disabled in response to inactivity detected for greater than a preset amount of time, disruptions in power supply, disruptions in connectivity of the appliance with the server via the network, and other such factors.

When remote control capability remains enabled, and it is determined, at block 560, that a remote operation command has been received, for example, from the authorized mobile external device via the server, the remote command may be executed, at block 570, to initiate the previously selected (and temporarily paused) cycle(s) and/or operation parameters (as illustrated in the example shown in FIG. 4E). As noted above, with the remote control capability enabled, communication between the external device and the appliance via the network may also facilitate remote control of other operations, such as, for example, termination of an operation currently being carried out, monitoring of a status of the appliance and/or monitoring of a current operation being carried out by the appliance, changes to previously set operation parameters, and the like, after operation of the appliance has been started.

Many of the appliances 110 shown in FIG. 1, such as, for example, the washing machine, the dryer, the range, the microwave oven, the dishwasher, and the refrigerator, may include a housing, with a chamber in the housing in which items may be received for treatment by the appliance. In some embodiments, the appliance may also include an image sensor, or camera, positioned so as to capture images of an interior of the chamber. Viewing of images captured by the camera may allow a user to verify the contents of the chamber prior to initiating a cooking operation by remote control. Positive visual confirmation by the user of the contents of the chamber prior to initiating a selected operation may eliminate the need to pre-set and then pause the selected operation as described above with respect to FIGS. 4A-4E. Rather, visual verification of the contents in the chamber may allow the user to use the external device associated with the appliance to also remotely select an operation and associated operating parameters, in addition to initiating the operation of the appliance as described above.

For example, the cooking appliance 200 shown in FIG. 2 includes a cooking chamber 230, or oven 230, in the housing 210, in which food items may be received for cooking by the heating elements 225 of the oven 230, with an image sensor 280, or camera 280, positioned to capture images of the interior of the oven 230. Using a registered external device 150 associated with the cooking appliance 200, the user may view the interior of the oven 230 and food items received therein, to confirm that the door 240 is closed, and to verify the contents of the oven 230. This may allow the user to ensure the contents of the oven 230 have not changed prior to initiating a cooking operation, to prevent inadvertent operation of the appliance, operation of the appliance in an unintended manner, and the like.

Figure 6:
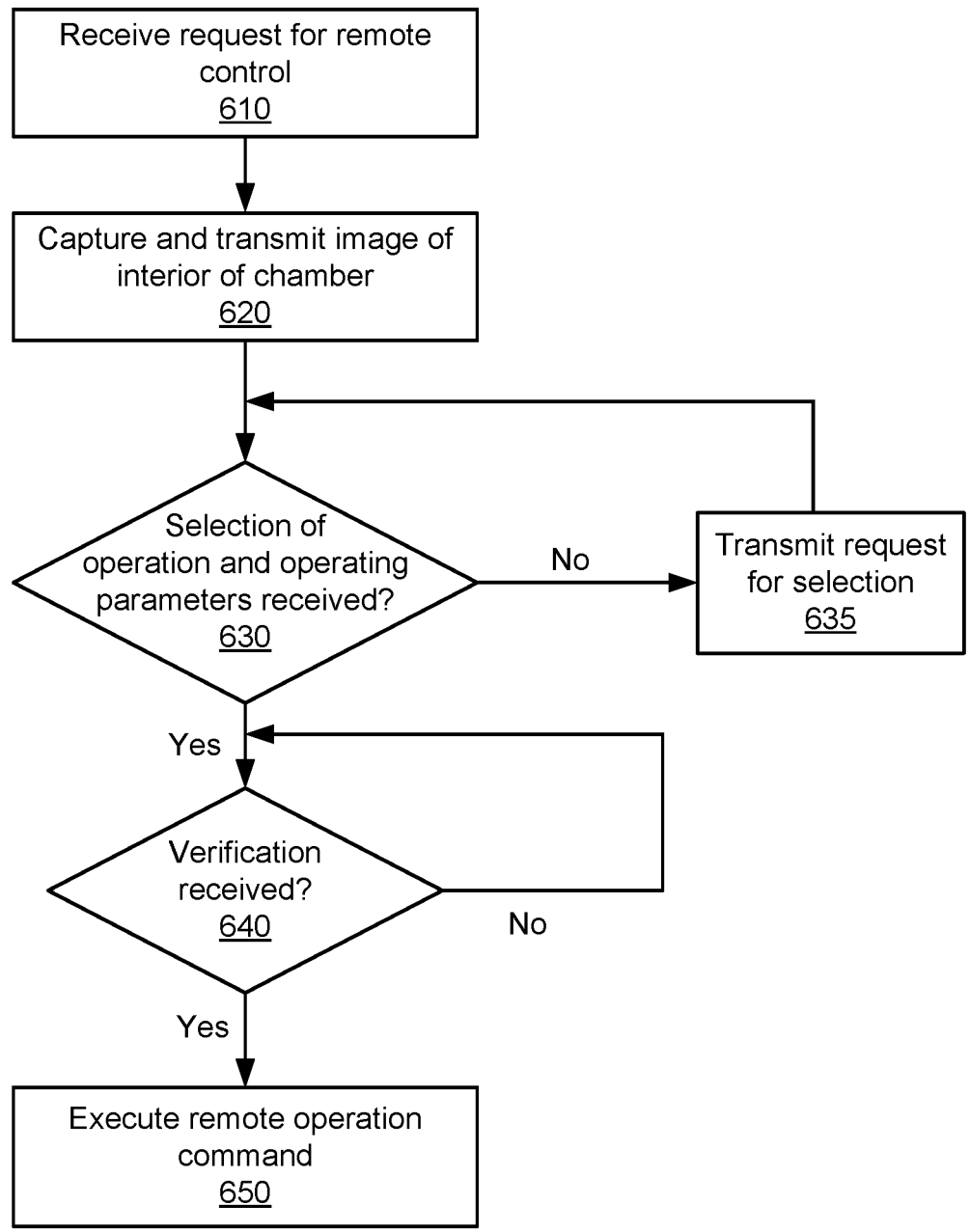
FIG. 6 is a flowchart of a method of controlling an appliance, in accordance with embodiments as broadly described herein

FIG. 6 is a flowchart of a method 600 of controlling an appliance, in accordance with embodiments as broadly described herein. First, a request for remote control of an appliance may be received, at block 610. The request may be received by the appliance, via the server, from a previously registered external device associated with the appliance. In response to the received request, at block 620, an image sensor as described above may capture an image of the interior of the chamber, and transmit the image to the external device, so that the user may view the image of the interior of the chamber and contents remotely (For example, the camera 280 of the cooking appliance 200 shown in FIG. 2 may capture an image of the interior of the oven 230 including any contents, and may transmit this image to the user via the network and the external device, for verification by the user.)

It is then determined, at block 630, if a selection of a cycle or operation and/or operation parameters have been received. If a selection has not been received, for example within a predetermined amount of time, a request for selection may be transmitted to the user, and in particular, to the user of the external device requesting remote control, at block 635. In some embodiments, the selection of a cycle or operation and/or operating parameters may be made by the user using an interface of the external device, and the selection may be transmitted from the external device to the appliance via the server. In some embodiments, the selection of a cycle or operation and/or operating parameters may be made by the user in advance, as described above with respect to FIGS. 4A-4D.

The user may verify, at block 640, a command to initiate the selected cycle or operation, based on the image(s) of the interior of the chamber and any contents in the chamber, captured by the image device of the appliance and transmitted to the external device of the user. Upon receiving verification to initiate the selected cycle or operation, the remote command may be executed, at block 650, to initiate the selected cycle or operation. As noted above, with the remote control capability enabled, communication between the external device and the appliance via the network may also facilitate remote control of other operations, such as, for example, termination of an operation currently being carried out, monitoring of a status of the appliance and/or monitoring of a current operation being carried out by the appliance, changes to previously set operation parameters, and the like, after operation of the appliance has been started.

The user's positive visual verification of the contents of the chamber, prior to proceeding with the remote operation and control of the appliance may further enhance user convenience, while ensuring that only known items and/or items appropriate for the selected cycle/operation are received in the chamber prior to initiating operation.

In some implementations, operation of the appliance 110 in the remote control mode may be terminated if a disabling event is detected, causing operation of the appliance in the remote control mode to be suspended. In some circumstances, detection of a disabling event may indicate that the contents of the chamber of the appliance may have changed or been otherwise disturbed, a previously selected cycle may no longer be carried out, and the like. Examples of disabling events may include, for example, an opening of a door of the chamber of the appliance 110 (i.e., an opening of the door 240 of the oven 230 of the example cooking appliance 200 shown in FIG. 2) while the appliance 110 is operating, an interruption in power supplied to the appliance 110, and other such events which may indicate a disruption in operation of the appliance in the remote control mode as originally intended. However, in some implementations, an event which would be considered a trigger to disable operation of the appliance 110 in the example described above (such as, for example, a detected opening of the door of the appliance 110), may actually be an intentional event, in which operation of the appliance 110 is to be continued, rather than suspended or terminated.

For example, as discussed above, the example cooking appliance 200 shown in FIG. 2 may be set for operation in the remote control mode, as described above with respect to, for example, FIGS. 4A-4E, 5 and 6. In some circumstances, a cooking operation, and/or a particular item being cooked in the oven 230, may involve an intentional opening of the door 240 at one or more intermediate points in the cooking operation, without triggering a termination or suspension of the cooking appliance 200 and/or disabling remote control of the operation of the appliance 200. For example, in some circumstances, the door 240 may be opened at one or more intermediate points during the cooking operation to position an item in the oven 230 after pre-heating, re-position the item in the oven 230, add ingredients to the item in the oven 230, mix/stir contents of the item, cover/uncover the item, and the like. In a situation in which the detection of an opening of the door 240 is intentional, and is not to trigger termination and/or alteration of the operation of the cooking appliance 200, certain mitigating actions and/or factors may cause the cooking appliance 200 continue to carry out the cooking operation, even when an opening of the door 240 is detected.

For example, in some implementations, a sensor, such as the sensor 245 on the example cooking appliance 200, may detect motion in proximity of the cooking appliance 200. The detected motion may be processed (for example, by a processor included in a controller as shown in FIG. 3), and it may be determined that the detected motion confirms that the cooking appliance 200 is attended, allowing for continued operation of the cooking appliance 200, even though the door 240 has been opened. In some implementations, this determination may be made based on, for example, a frequency of motion detected, or a type of motion detected. In some implementations, the detected motion may correspond to a preset gesture, or series of gestures, recognized by the sensor 245 and the processor, the preset gesture corresponding to a command allowing for continued operation of the appliance 200. In some implementations, the sensor may include an image sensor that captures an image to verify an identity of a user to allow for continued operation of the cooking appliance 200 even though the door 240 has been opened.

In some implementations, the system may request verification from the user that is in remote control of the cooking appliance 200 (via the network) to allow for continued operation of the cooking appliance 200 even though the door 240 has been opened. In some implementations, this verification may be requested from the user that is in remote control of the cooking appliance 200 when the opening of the door 240 is detected. In some implementations, this verification request may include data collected, for example, by the sensor 245 as described above, so that the remote user has this additional information when making a determination as to whether or not continued operation of the cooking appliance 200 should be authorized in light of the detected opening of the door 240.

In some implementations, this verification may be requested from the user via, for example, a prompt or alert provided to the user for example, on a display of a control panel of the appliance. In some implementations, this prompt or alert indicating that a disabling event (such as, for example, an opening of the door or interruption in power to the appliance) has been detected may also include options for proceeding, based on the disabling event detected. For example, the system may present the user with options for disabling operation of the appliance in the remote control mode, or maintaining operation of the appliance in the remote control mode. In some implementations, if the user does not respond to the alert, for example, by selecting the pop up window, and/or by responding to the prompt, within a set amount of time, the appliance may be set to operate in accordance with a set protocol, such as, for example, cancelling operation in the remote control mode, or maintaining operation in the remote control mode, based on set user preferences, factory settings, a particular operation being performed by the appliance and other such factors.

As described above, a user who is remotely located from the cooking appliance 200 may remotely control operation of the cooking appliance 200 via an application running on a mobile external device 150. In some implementations, the system may detect when that user, and in particular, that mobile device 150, is within a set proximity of the cooking appliance 100. Detection of the mobile device 150 within the set proximity of the cooking appliance 200 may provide an indication to the system that the cooking appliance is now attended. While the mobile device 150 remains within the set proximity of the cooking appliance 200, the cooking appliance 200 may continue to operate, even if an opening of the door 240, or other disabling event, is detected. In some implementations, remote control and monitoring of the cooking appliance 200 may be conducted by the user via the application running on the mobile device 150, even when the mobile device 150 is within the set proximity of the cooking appliance 200.

In some implementations, an appliance 110 may complete a set cycle or operation while operating in the remote control mode, and remain enabled for continued operation in the remote control mode after completion of the cycle if an event triggering termination of operation in the remote control mode is not detected. This may allow follow on operation(s) and/or cycles to be carried out on the items received in the appliance, while still operating in the remote control mode. For example, laundry treatment machines, such as a washing machine or dryer, may operate in the remote control mode to perform washing and/or drying operations on clothing items received in a treatment chamber of the laundry machine, for example, in accordance with a cycle selected by the user as described above. In some implementations, upon completion of the cycle, the laundry treatment machine may remain operable in the remote control mode, so that follow on operations such as, for example, a refresh operation, may be selected and executed remotely by the user, as long as an event triggering termination of the remote control mode has not been detected. Events triggering termination of the remote control mode may include, for example, detection of an opening of the door of the laundry treatment machine, an interruption in power to the laundry treatment machine, an alteration in cycle of the laundry treatment machine, and the like.

For example, in some implementations, at the end of an operation cycle of the appliance, an event, which would normally trigger a disabling of operation of the appliance in the remote control mode may be detected. However, prior to cancelling the operation in the remote control mode, the user may receive a prompt, for example, displayed to the user, for example, on a control panel of the appliance. This prompt may present the user with an option to cancel or disable operation of the appliance in the remote control mode. In some implementations, the remote control mode may remain enabled if the user does not respond within a set amount of time, if the displayed prompt times out, and the like.

Similarly, in some implementations, when the appliance is in an idle mode, and, for example, not operational, the user may enable operation in the remote control mode, for example, in anticipation of a need to later operate the appliance remotely. In some implementations, this may be accomplished by, for example, initiating this action at the appliance. For example, the user may open and close the door of the appliance to activate the appliance from the idle state. In response to this activation from the idle state, the user may receive a prompt, for example, on a control panel of the appliance. This prompt may present the user with an option to, for example, re-enable the remote control mode. The user may then respond to the prompt to re-enable the remote control mode, or may ignore the prompt, thus maintaining the disabled state of the remote control mode and/or the idle state of the appliance. In some implementations, this prompt may be received via the application running on the user's computing device.

Figure 7:
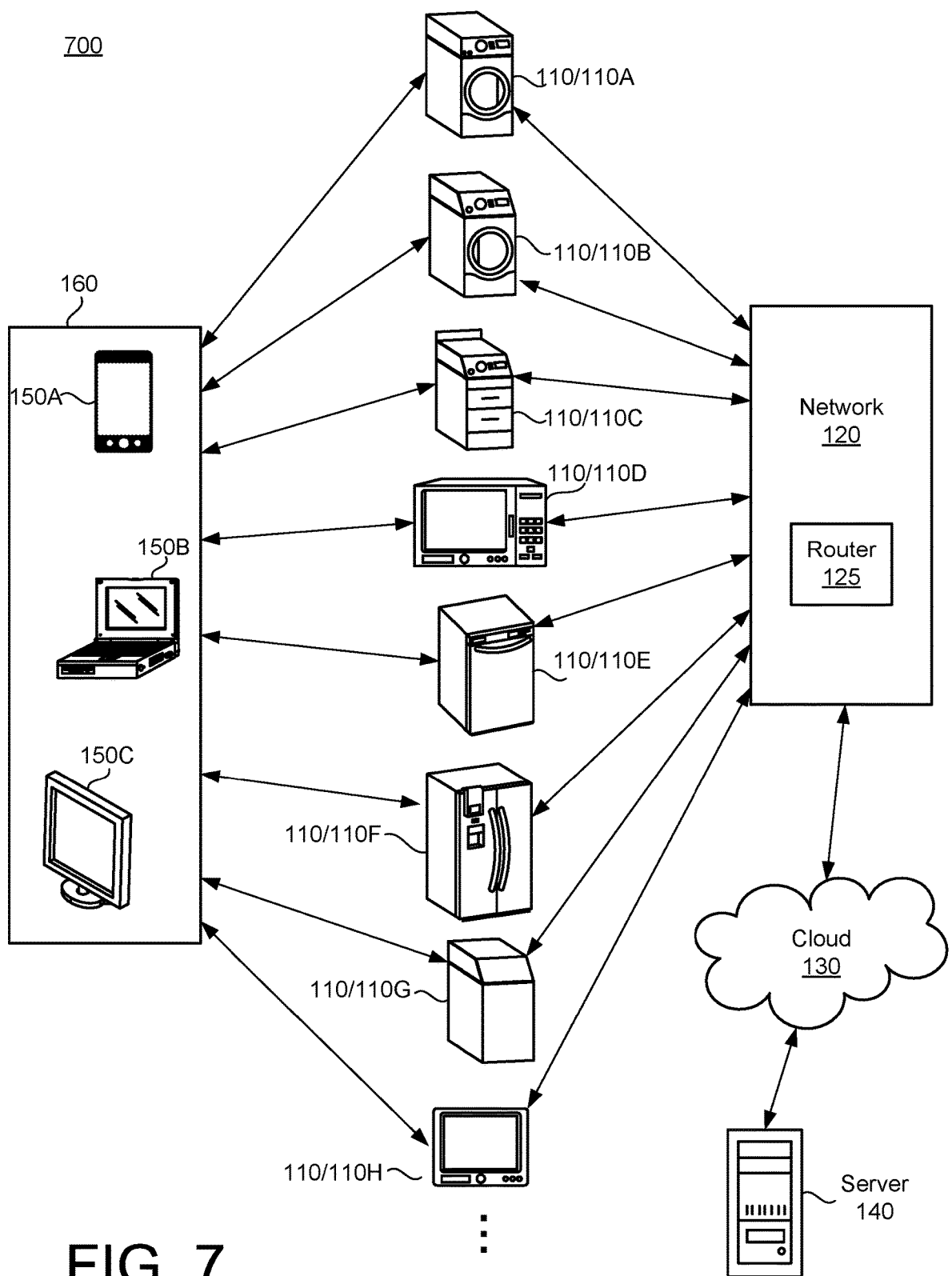
FIG. 7 illustrates a system of networked appliances, in accordance with embodiments as broadly described herein.

As shown in FIG. 7, a system 700, in accordance with embodiments as broadly described herein, may include the plurality of appliances 110, as discussed above, in communication with the network 120, e of the appliances 110 including a communication device 115 allowing the appliances 110 to communicate with the cloud 130 and/or an external server 140 via the network 120 and the router 125. The appliances 110 may also communicate with various other computing devices that may be located within the home, such as, for example, external devices 150 including, for example a smartphone 150A or a tablet computing device 150C, or a desktop and/or laptop computing device 150B, and the like.

In the arrangement shown in FIG. 7, the computing devices 150 may maintain two-way communication with the network 120 and router 125, and the appliances 110 may maintain two way communication with the network 120 and the router 125. However, while the appliances 110 may communicate information to the external computing devices 150, the external computing devices 150 do not maintain a direct line of communication with the appliances. Rather, communication of information from one of the computing devices 150, intended for one of the appliances 110, is transmitted from the computing device 150, to the network 120/router 125, which then transmits the information to the intended appliance 110.

Figure 8:
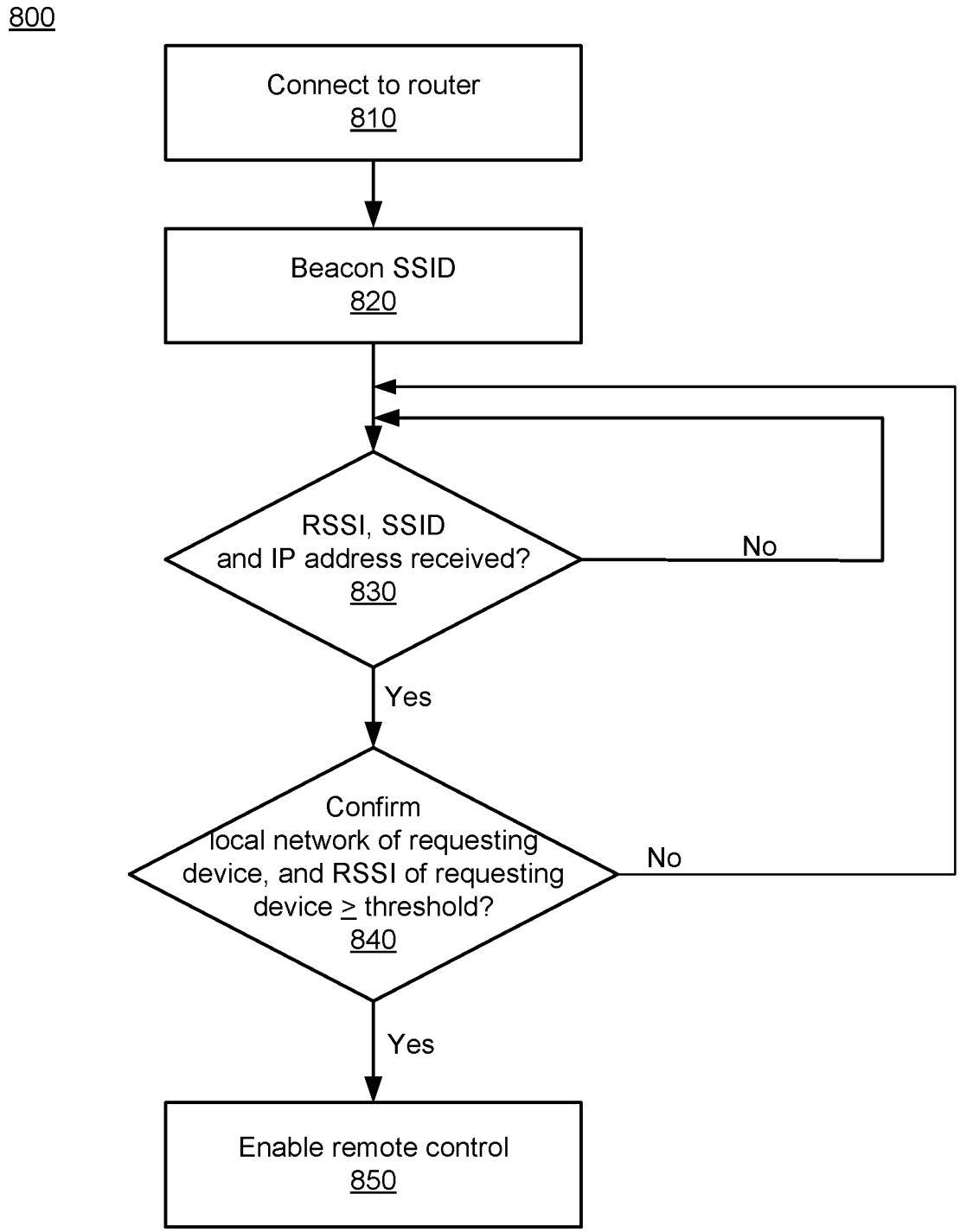
FIG. 8 is a flowchart of a method of controlling an appliance, in accordance with embodiments as broadly described herein.

In the example implementation shown in FIG. 7, each of the appliances 110 and its respective communication device 115 may define its own WiFi router, connected to the network router 125, with the computing devices 150 connected to the appliances via the network router 125. FIG. 8 is a flowchart of a method 800 of controlling an appliance in a network arranged as shown in FIG. 7, in accordance with embodiments as broadly described herein Each communication device 115, acting as a WiFi router, may, at block 810, connect to the network router 125, and may beacon its service set identifier (SSID), at block 820. One of the external computing devices 150 (in use by the user, for remote control of one or more of the appliances) may receive these beacons, along with a signal strength of the received beacon, and the external computing device 150 may identify itself and its received signal strength indication (RSSI) to the appliance 110 intended to be remotely controlled by the external computing device 150, through the network router 125. When, at block 30, the RSSI, SSID, and an interne protocol (IP) address of the external computing device 150 is received by the communication device 115 of the appliance 110, the communication device 115 may confirm its own RSSI and SSID, along with the IP address of the external computing device 150, to determine, at block 840, that the external computing device 150 is operating within the same local network 120 as that of the appliance (the external computing device 150 having the same subnet IP address as the appliance 110, being connected to the same network router 125), and may compare the received RSSI with a set threshold, to further confirm that the external computing device 150 is within a set physical range. The communication device 115, at block 850, may allow remote control of the appliance 110 when it is confirmed that the IP address of the external computing device 150 corresponds to the network of the appliance, and the received RSSI is greater than or equal to the set threshold. Remote control of the appliance may then be carried out as described above.

The automatic recognition of the external computing device 150 within the local network 120 of the appliance 110 may allow a user, for example, within a home, to remotely control an appliance within the home, from a personal computing device. Because the computing device 150 and the appliance 110 to be remotely controlled by the computing device 150 are, necessarily, within the same local network to enable this remote control by the computing device 150, the need for previous selection of cycle(s) and operating parameters and remote control from a pause mode of the appliance (as described above with respect to FIGS. 4A-4E and 5) and/or positive confirmation of contents of a chamber of the appliance prior to allowing remote control of the appliance (as described above with respect to FIG. 6) may be mitigated. That is, in this arrangement, the operator of the external computing device 150 and the appliance 110 are necessarily within the (relatively short) range of the same local network 120, indicating that the appliance 110 is attended. In this arrangement, the computing device 150 may control the appliance 110 directly over the local network once the computing device 150 has been properly identified by the communication device 115 of the appliance 110, or, as communication between the computing device 150 and the server 140, and the server 140 and the appliance 110, is maintained, the computing device 150 may control the appliance 110 via the server 140, as previously described. As noted above, with the remote control capability enabled, communication between the external device and the appliance via the network may also facilitate remote control of other operations, such as, for example, termination of an operation currently being carried out, monitoring of a status of the appliance and/or monitoring of a current operation being carried out by the appliance, changes to previously set operation parameters, and the like, after operation of the appliance has been started.

In the embodiments described above, remote control of an appliance through a separate computing device, such as, for example, a external device, may be enabled for a device that has been authorized for remote control of the appliance and has been associated with the appliance. In the embodiments described above, verification of a status of the appliance (for example, verification that a door of a washing machine is closed prior to initiating a washing cycle) and/or verification of the contents of a chamber of the appliance, prior to initiating a selected cycle may provide some assurance that the selected cycle or operation can be carried out as intended by the user. This confirmation, by remote access prior to operation, may prevent unwanted or inadvertent operation of the appliance, particularly in a situation in which the user is not co-located with the appliance to personally observe and oversee operation, while still enhancing user convenience.

In some situations, a user may initiate operation of the appliance directly, via, for example, the control panel, with communication between the external device and the appliance via the network facilitating remote control of the operating appliance. For example, parameters of a cooking operation may be selected, and a cooking operation may be initiated, through user manipulation of the control panel 260, to cook an item placed in the cooking chamber 230 of the cooking appliance 200 shown in FIG. 2. As communication between the external device and the cooking appliance 200 is enabled via the network, the user may use the external device to control other operations of the cooking appliance, such as, for example, termination of the current cooking operation, monitoring of the progress of the cooking operation, changes/adjustments to the previously selected operation parameters such as, for example, time, temperature and the like, the disabling of a timer, and the like. As, in this situation, the status of the cooking appliance, verification of the contents of the cooking chamber 230 and the like may be verified by the user's physical presence and proximity to the appliance 200 upon initiation of the cooking operation, unwanted or inadvertent operation of the appliance 200 may be avoided, while the ability to remotely control the already operating appliance may enhance utility, functionality and convenience to the user.

In some embodiments, a cycle or operation and/or associated operating parameters to be carried out by the appliance may be selected and set in advance, and a pause or hold may be placed on the selected operation, enabling a remote control mode. The appliance, in the remote control mode, may be remotely controlled by the external device, and operation of the pre-selected cycle or operation may be carried out based on a remote control signal transmitted from the external device to the appliance, provided the remote control mode of the appliance has not been disabled due to one or more disabling factors. These disabling factors may include for example, an opening of the door of the chamber, an amount of time elapsed since enabling the remote control mode exceeding a predetermined threshold, and other such factors which may indicate that the contents of the chamber may have been altered. In some embodiments, the contents of the chamber of the appliance may be visually verified by the user prior to initiating a selected operation of the appliance, thus providing positive visual confirmation to the user that the contents of the chamber have not been altered prior to carrying out a selected cycle or operation.

In some embodiments, a user of a external device associated with a particular appliance and authorized for remote control of the appliance may restrict or limit another user's ability to alter, disable or enable control features associated with the appliance.

In some embodiments, a user of a external device associated with a particular appliance and authorized for remote control of the appliance may remotely start and/or pause and/or start various operations, and may remotely add to and/or detract from and/or alter previously selected operation parameters, cycles, features and the like.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of controlling an appliance in a network, the method including:
    enabling communication between a communication device of the appliance and an external device via the network and a server external to the network;
    enabling a remote control mode of the appliance;
    receiving, by the appliance, a first input including a selection of an operation to be executed by the appliance; and
    prior to the execution of the selected operation by the appliance, one of detecting by the appliance or receiving by the appliance, wherein:
        detecting by the appliance includes detecting while operating the appliance in the remote control mode, one of a plurality of disabling events indicative that contents of a chamber of the appliance have changed, and in response to the detecting one of the plurality of disabling events, determining whether the one of a plurality of disabling events was intentional or unintentional, and in response to a determination that the one of a plurality of disabling events was unintentional disabling the remote control mode and triggering a suspension of the selected operation to be executed by the appliance; and
        receiving by the appliance includes receiving a second input, from the external device via the server, and executing the selected operation in response to the second input;
    detecting one of the plurality of disabling events includes an opening of a door of the appliance detected by a door sensor of the appliance, a period of time elapsed between receiving the first input and receiving the second input exceeding a preset threshold, or a period of inactivity of the appliance exceeding a preset threshold;
    maintaining operation of the appliance in response to receiving a verification input; and
    canceling the selected operation to be executed by the appliance in absence of a verification input.

2. The method of claim 1, wherein receiving a first input includes:
    receiving the first input through a control panel of the appliance, or receiving the first input by the communication device of the appliance from the external device via the external server and the network, wherein when the first input is received through the control panel of the appliance, the remote control mode is enabled after receiving the first input, and when the first input is received by the communication device via the external server and the network, the remote control mode is enabled before receiving the first input.

3. The method of claim 2, wherein the detecting one of the plurality of disabling events while operating the appliance in the remote control mode includes an opening of a door of the appliance detected by a door sensor of the appliance, a period of time elapsed between receiving the first input and receiving the second input exceeding a preset threshold, or a period of inactivity of the appliance exceeding a preset threshold.

4. The method of claim 3, further comprising:
    detecting at least one of a set motion external to the appliance captured by a motion sensor of the appliance, a set image external to the appliance captured by an image sensor of the appliance, or the external device within a set proximity of the appliance; and
    maintaining operation of the appliance based on the detection of at least one of the set motion, the set image, or the external device within the set proximity.

5. The method of claim 4, wherein maintaining operation of the appliance based on the detection of at least one of the set motion, the set image, or the external device within the set proximity includes:
    sending, by the appliance via the network, a verification request to the external device, the verification request including information related to the detected disabling event and the detected at least one of the set motion or the set image;
    receiving, by the appliance, from the external device via the network, a verification command in response to the verification request; and
    maintaining operation of the appliance in response to the verification command.

6. The method of claim 1, wherein receiving a first input includes: receiving, through a control panel of the appliance, the selection of the operation
    including at least one operating parameter associated with the operation; and
        thereafter enabling the remote control mode of the appliance, including receiving, through the control panel of the appliance, a pause command and pausing execution of the selected operation in response to the pause command.

7. The method of claim 1, wherein receiving the verification input includes:
    detecting at least one of a set motion external to the appliance captured by a motion sensor of the appliance, a set image external to the appliance captured by an image sensor of the appliance, or the external device within a set proximity of the appliance; and verifying continued operation of the appliance based on the detection.

8. The method of claim 6, wherein executing the operation in response to the second input includes:
    receiving, at the communication device of the appliance, the second input, the second input being transmitted to the communication device from the external device via the external server and the network; and
    releasing the pause on the selected operation, and executing the selected operation, in response to the second input.

9. The method of claim 1, wherein receiving a first input includes: receiving, by the communication device of the appliance, the first input, the first input being transmitted to the communication device from the external device via the external server and the network.

10. The method of claim 9, wherein receiving a second input includes: receiving, by the communication device of the appliance, the second input, the second input being transmitted to the communication device from the external device via the external server and the network, the second input including a request to execute the selected operation; and capturing, by an image sensor of the appliance, an image of a designated portion of the appliance, and transmitting the captured image to the external device via the network and the external server, in response to the request to execute the selected operation.

11. The method of claim 10, wherein executing the selected operation in response to the second input includes:

receiving, by the communication device of the appliance, in response to the transmission of the captured image, a confirmation command confirming the request to execute the selected operation; and executing the selected operation in response to the confirmation command.

12. The method of claim 10, further comprising: disabling the remote control mode when one of the plurality of disabling events includes an opening of a door of the appliance detected by a door sensor of the appliance, a period of time elapsed after receiving the first input and prior to receiving the second input exceeding a preset threshold, a period of inactivity of the appliance exceeding a preset threshold, a period of time elapsed after transmitting the captured image and prior to receiving a confirmation command exceeding a preset threshold, or receiving of a cancel command through a control panel of the appliance or from the external device via the external server and the network.

13. The method of claim 1, wherein enabling communication between a communication device of the appliance and an external device via the network and a server external to the network, and enabling a remote control mode of the appliance, includes transmitting, by the communication device of the appliance, a service set identifier (SSID) of the communication device;

receiving, by the communication device, in response to the transmitted SSID, a received signal strength identifier (RSSI) of the external device;

confirming, by the communication device, in response to the received RSSI, that a local IP address of the external device corresponds to the network of the appliance;

comparing, by the communication device, the received RSSI to a set threshold; and enabling the remote control mode of the appliance when it is confirmed that the local IP address of the external device corresponds to the network of the appliance and the received RSSI is greater than or equal to the set threshold, allowing remote control of the appliance by the external device.

14. The method of claim 1, wherein receiving a first input comprises receiving a first input at a control panel of the appliance selecting the operation to be executed and executing the operation, and receiving a second input from the external device comprises receiving an input from the external device changing at least one operating parameter of the operation being executed.

15. An appliance, comprising: a housing;
a chamber included in the housing, the chamber configured to receive items therein for treatment;
a control panel configured to receive user input;
a controller configured to control operation of the appliance based on the user input received at the control panel; and
a communication device configured to provide for communication between the controller and an external server via a local network;

wherein, in a remote control mode of the appliance, the controller is configured to:

process a first input, the first input including a selection of an operation to be executed by the appliance; and prior to the execution of the selected operation by the appliance, one of detect by the appliance or receive by the appliance, wherein:

receive by the appliance includes receiving a second input, from an external device via the server, and execute the selected operation in response to the second input;

detect by the appliance includes detecting while operating the appliance in the remote control mode, one of a plurality of disabling events indicative that the items received by the chamber of the appliance have changed, wherein one of the plurality of disabling events includes an opening of a door of the appliance detected by a door sensor of the appliance, a period of time elapsed between receiving the first input and receiving the second input exceeding a preset threshold, or a period of inactivity of the appliance exceeding a preset threshold, and in response to the detecting one of the plurality of disabling events;

determine whether the one of a plurality of disabling events was intentional or unintentional, and in response to a determination that the one of a plurality of disabling events was unintentional, disable the remote control mode and trigger a suspension of the selected operation of the appliance to be executed;

maintain operation of the appliance in response to receiving a verification input; and cancel the selected operation to be executed by the appliance in absence of a verification input.

16. The appliance of claim 15, wherein the controller is configured to: receive the first input via the control panel of the appliance, the selection of the operation including at least one operating parameter associated with the selected operation;

pause execution of the selected operation to enable the remote control mode in response to a pause command included in the first input; and enable communication between the communication device and the external device via the server and the network in response to the first input.

17. The appliance of claim 16, wherein the controller is configured to: receive the second input, transmitted from the external device to the communication device via the external server and the network;

release the pause on the selected operation in response to the second input; and execute the selected operation in response to the release of the pause.

18. The appliance of claim 15, wherein the controller is configured to receive the first input from the communication device, the first input being transmitted to the communication device from the external device via the external server and the network.

19. The appliance of claim 18, wherein the controller is configured to receive the second input from the communication device, the second input being transmitted to the communication device from the external device via the external server and the network, the second input including a request to execute the selected operation.

20. The appliance of claim 19, the appliance further comprising an image sensor located on the appliance to capture an image of the chamber, wherein, in response to the request to execute the selected operation, the image sensor is configured to capture an image of the chamber and transmit the captured image to the external device via the network and the external server.

21. The appliance of claim 20, wherein the controller is configured to: receive, in response to the transmission of the captured image, a confirmation command confirming the request to execute the selected operation; and execute the selected operation in response to the confirmation command.

22. The appliance of claim 15, wherein the communication device is configured to:

transmit an SSID of the communication device;

receive, in response to the transmitted SSID, an RSSI of the external device, the external device being in communication with the network;

confirm, in response to the received RSSI, a local IP address of the external device corresponding to the network of the appliance;

compare the received RSSI of the external device to a set threshold; and enable the remote control mode of the appliance when it is confirmed that the local IP address of the external device corresponds to the network of the appliance and the received RSSI is greater than or equal to the set threshold, allowing remote control of the appliance by the external device.

23. The appliance of claim 15, wherein the appliance is one of plurality of appliances connected via the network, the appliance being one of a range including an oven, a microwave oven, a washer, a dryer, a dishwasher or a refrigerator, and wherein the external device is one of a smartphone, a tablet computing device, a laptop computing device, or a desktop computing device.

* * * * *